(12) United States Patent
Nochi et al.

(10) Patent No.: US 7,390,770 B2
(45) Date of Patent: Jun. 24, 2008

(54) CATALYST FOR PURIFYING AN EXHAUST GAS AND A PREPARATION PROCESS OF THE CATALYST

(75) Inventors: Katsumi Nochi, Hiroshima-ken (JP); Masanao Yonemura, Hiroshima-ken (JP); Yoshiaki Obayashi, Hiroshima-ken (JP); Toshiyuki Onishi, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/279,861

(22) Filed: Apr. 14, 2006

(65) Prior Publication Data

US 2006/0240977 A1 Oct. 26, 2006

(30) Foreign Application Priority Data

Apr. 15, 2005 (JP) .............................. 2005-118284

(51) Int. Cl.
*B01J 23/00* (2006.01)
*B01J 21/00* (2006.01)
*B01J 20/00* (2006.01)

(52) U.S. Cl. ................. 502/327; 502/104; 502/107; 502/326; 502/332; 502/333; 502/334; 502/339; 502/355; 502/415; 502/439; 502/349; 502/350

(58) Field of Classification Search ............... 502/104, 502/107, 326, 327, 332, 333, 334, 339, 415, 502/355, 439, 349, 350
See application file for complete search history.

(56) References Cited

U.S. PATENT DOCUMENTS

| 3,087,828 | A | * | 4/1963 | Linton | 106/417 |
|---|---|---|---|---|---|
| 3,276,993 | A | * | 10/1966 | Reid, Jr. | 208/120.1 |
| 3,397,154 | A | * | 8/1968 | Talsma | 502/304 |
| 4,087,622 | A | * | 5/1978 | Nakamura et al. | 560/245 |
| 5,232,889 | A | | 8/1993 | Blanchard et al. | |
| 5,352,646 | A | | 10/1994 | Blanchard et al. | |
| 5,541,147 | A | * | 7/1996 | Friedlander et al. | 502/100 |
| 5,578,283 | A | | 11/1996 | Chen et al. | |
| 6,228,800 | B1 | * | 5/2001 | Yamaguchi et al. | 502/339 |
| 6,306,552 | B1 | | 10/2001 | Yasunaga et al. | |
| 2003/0054953 | A1 | * | 3/2003 | He et al. | 502/302 |

FOREIGN PATENT DOCUMENTS

| JP | 07-047288 | 2/1995 |
|---|---|---|
| JP | 10-309462 | 11/1998 |
| JP | 2002-1119 | 1/2002 |
| JP | 3516734 | 1/2004 |
| JP | 2004-263222 | 9/2004 |

OTHER PUBLICATIONS

T. Hill, "Adsorption from a one-dimensional lattice gas and the Brunauer-Emmett-Teller equation," Proc. Natl. Acad. Sci. USA, vol. 93, pp. 14328-14332, Dec. 1996.

* cited by examiner

*Primary Examiner*—Cam N. Nguyen
(74) *Attorney, Agent, or Firm*—Lowe Hauptman Ham & Berner LLP

(57) ABSTRACT

A catalyst for purifying an exhaust gas containing carbon monoxide and volatile organic compounds, which has a coat layer of a carrier composed of a porous inorganic compound, wherein the coat layer is a single layer, the porous inorganic compound has a BET specific surface area of 50 $m^2/g$ or greater, and the coat layer has, within a 50 μm depth from the surface thereof, an active metal having a particle size of 15 nm or less and composed of at least one noble metal.

7 Claims, No Drawings ial equipment, for CATALYST FOR PURIFYING AN EXHAUST
GAS AND A PREPARATION PROCESS OF
THE CATALYST

RELATED APPLICATIONS

The disclosure of Japanese Patent Application No. 2005-118284 filed on Apr. 15, 2005 including the specification, the claims, and the abstract is incorporated herein by reference in its entirety.

BACKGROUND OF THE INVENTION

Field of the Invention

The present invention relates to a catalyst for purifying an exhaust gas and a preparation process of the catalyst. More specifically, the present invention pertains to a catalyst for purifying an exhaust gas containing carbon monoxide and volatile organic compounds, and a preparation process of the catalyst.

Exhaust gases emitted from industrial equipment, for example, automobiles, airplanes and various factories contain $NO_x$, $SO_x$, CO (carbon monoxide) and hydrocarbons which have remained unburned. Exhaust gas purifying catalysts are used for treating such substances contained in the exhaust gas.

For example, an NMHC oxidation catalyst having Pt (platinum) supported on an alumina carrier is described in Japanese Patent Laid-Open No. Hei 10-309462.

Such conventional exhaust gas purifying catalysts use an expensive noble metal such as Pt. In order to load Pt on alumina, which is a carrier, by the impregnation method, it is common practice to dissolve Pt in the form of a nitrate or the like in water, add alumina powder to the resulting aqueous solution, stir the resulting mixture as needed to impregnate alumina with the platinum compound, and then, dry and calcine it in a conventional manner.

The conventional process however is costly because a large amount of an expensive noble metal such as Pt must be added. A reduction in the amount of noble metal for the purpose of decreasing production costs however retards the burning rate of the substance to be purified and prevents the resulting catalyst from exhibiting adequate performance.

SUMMARY OF THE INVENTION

The present invention has been made to solve the above-described problem. An object of the present invention is to provide an exhaust gas purifying catalyst which enables reduction of a loading amount of a noble metal to decrease the production cost of the catalyst, and a preparation process of the catalyst.

With a view to attaining the above-described object, the present invention provides a catalyst for purifying an exhaust gas containing carbon monoxide and volatile organic compounds, which comprises a coat layer of a carrier having a porous inorganic compound, wherein the coat layer is a single layer, the porous inorganic compound has a BET specific surface area of 50 m²/g or greater, and the coat layer has, within a 50 μm depth from the surface thereof, an active metal having a particle size of 15 nm or less and comprising at least one noble metal.

In the exhaust gas purifying catalyst of the present invention, 50 wt. % or greater of a loading amount of the noble metal is preferably incorporated within a 30 μm depth from the surface of the coat layer.

In another aspect of the present invention, there is also provided a process for preparing the exhaust gas purifying catalyst, which comprises subjecting an aqueous metal salt solution obtained by dissolving at least one metal salt in water to reduction treatment to prepare a corresponding aqueous metal colloid solution, and immersing a substrate having the coat layer in the aqueous metal colloid solution to load the active metal on the coat layer.

According to the present invention, an exhaust gas purifying catalyst which can be produced at a reduced cost because of a reduction in the loading amount of a noble metal; and a preparation process of the catalyst are provided.

In particular, in the preparation process of an exhaust gas purifying catalyst according to the present invention, an aqueous metal salt solution containing a pH buffer may be prepared. The buffer contributes to maintaining the pH at a constant level irrespective of the evaporation of the solution during preparation of a colloid. This makes it possible to stabilize the reduction rate of a metal ion and prepare very fine colloid particles. In the loading step, the aqueous metal colloid solution still has a pH buffer action so that the pH can also be maintained at a constant level irrespective of how a carrier is impregnated with an active metal. The metal can therefore be loaded on the carrier in a highly dispersed form. Even if the pH buffer is not added during the colloid preparation step, it can be added newly in the loading step.

DETAILED DESCRIPTION OF THE PREFERRED EMBODIMENT

The preparation process of an exhaust gas purifying catalyst according to the present invention will next be described more specifically.

The present invention provides a catalyst for purifying an exhaust gas containing carbon monoxide and volatile organic compounds. In other words, the exhaust gas purifying catalyst available by the present invention is suited for the treatment of an exhaust gas discharged from so-called lean combustion gas engine or gas turbine. The term "volatile organic compounds" usually means hydrocarbons other than methane and ethane.

The exhaust gas purifying catalyst of the present invention has a coat layer of a carrier composed of a porous inorganic compound.

As the porous inorganic compound, that is, the compound constituting the carrier, at least one compound selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, and $SO_4/TiO_2$—$ZrO_2$ is preferable.

In the exhaust gas purifying catalyst of the present invention, a carrier composed of such a compound is coated as a single layer onto a substrate, because the burden related to the production of the catalyst can be reduced by coating the carrier as a single layer.

Examples of the substrate include ceramic honeycomb substrates (monolith), for example, cordierite substrate and stainless steel honeycomb substrates (monolith). A single coat layer can be formed by wash-coating the substrate with a slurry solution containing the carrier.

The exhaust gas purifying catalyst of the present invention contains, as a carrier, a porous inorganic compound composed of the above-described compound and having a BET specific surface area of 50 m²/g or greater in order to load, on the carrier, a metal colloid in the highly dispersed form.

The exhaust gas purifying catalyst of the present invention has, within a 50 μm depth from the surface of the coat layer, an active metal having a particle size of 15 nm or less and composed of at least one noble metal. The catalyst preferably contains, within a 30 μm depth from the surface of the coat layer, at least 50% of a loading amount of the noble metal. This permits existence of an active component in the surface layer of the catalyst, which greatly improves the catalytic activity and enables efficient exhaust gas purification.

As the noble metal to be supported on the catalyst, at least one noble metal selected from the group consisting of Ir, Rh, Ru, Pt, Pd, Ag, and Au and oxides thereof is preferred.

A preferred embodiment of the preparation process of the exhaust gas purifying catalyst according to the present invention will next be described.

In the preparation process of the exhaust gas purifying catalyst according to the present invention, an aqueous metal salt solution is prepared by dissolving at least one metal salt in water. The resulting aqueous metal salt solution is subjected to reduction treatment to prepare a corresponding aqueous metal colloid solution. A substrate equipped with a coat layer of a carrier is immersed in the aqueous metal colloid solution to load the active metal on the carrier composed of the porous inorganic compound which carrier constitutes the coat layer.

The metal salt is preferably a metal salt of a noble metal actualizing catalytic activity and a plurality of metal salts of a noble metal can be used. Preferred examples of the salt of a noble metal include nitrates, chlorides, acetates and complex salts of Ir, Rh, Ru, Pt, Pd, Ag and Ru. Of these, nitrates, chlorides, acetates and complex salts of Pt, Pd and Ru are more preferred.

The aqueous solution having at least one metal salt dissolved therein is added to, for example, a desired water/reducing agent/polymer material mixture selected from those described below.

The water/reducing agent/polymer material mixture is prepared by dissolving a polymer material in water and then adding a reducing agent to the resulting solution in consideration of the later reduction treatment.

It is also possible to add a mixed solution of a reducing agent and a polymer material to an aqueous solution not containing the polymer material.

In either case, water is preferably used after removal of dissolved oxygen therefrom by boiling it. The dissolved oxygen may be removed by boiling after mixing a polymer material and a reducing agent in water.

As a compound usable as the reducing agent, organic acids are preferred. Examples include sodium citrate, potassium citrate, carboxylic acids such as acetic acid, formic acid and malic acid, alcohols such as methanol, ethanol and propanol, ethers such as diethyl ether and ketones such as methyl ethyl ketone.

Examples of a compound usable as the polymer material include water soluble polymers such as polyvinyl alcohol, polyvinyl pyrrolidine and poly(methyl vinyl ether).

In the preparation process of the exhaust gas purifying catalyst according to the present invention, the metal colloid solution is prepared by subjecting the aqueous metal salt solution thus obtained to reduction treatment. In general, this reduction reaction proceeds by heating such an aqueous metal salt solution to from about 80 to 95° C.

Metal colloid particles are produced by the reduction reaction of a metal dissolved as an ion, and by completion of the reaction, a metal colloid solution is prepared. Since the polymer material covers the metal colloid therewith, the metal colloid exists stably without causing coagulation sedimentation.

Then, the above-described substrate is immersed in the metal colloid solution to load the active metal on the coat layer of the substrate. The substrate is then dried and if necessary, calcined to yield an end product.

When the substrate is immersed in the metal colloid solution, the concentration of the metal colloid therein preferably falls within a range of from 0.01 wt. % to 1.0 wt. %. The concentrations smaller than 0.01 wt. % do not prevent the loading of the active metal, but retard the adsorption rate. Such concentrations are therefore not realistic. Concentrations greater than 1.0 wt. % on the other hand are not preferred because the coagulation sedimentation of the metal colloid occurs several days after preparation.

When the substrate is immersed in the colloid solution, the concentration of the polymer material preferably falls within a range of from 0.05 to 3.0 wt. %. Within this range, the polymer material can exist stably without causing coagulation sedimentation at room temperature even for a month or greater. Concentrations smaller than 0.05 wt. % make the metal colloid unstable and tend to cause coagulation sedimentation. At concentrations exceeding exceeds 3.0 wt. %, on the other hand, the metal colloid covered with the polymer material has an increased diameter and prevents adsorption of it to pores of the coat layer. Concentrations outside the above-described range are therefore not preferred.

When the substrate is immersed in the metal colloid solution, the pH of the solution is preferably less than 5. A pH of 5 or greater is not realistic, because a surface potential difference with the coat layer becomes small and the adsorption rate of the metal colloid decreases. The pH of from 2 to 5 is especially preferred. At pH less than 2, an adsorption rate of the metal colloid becomes too high, which makes it difficult to control the loading amount.

In the preparation process of the exhaust gas purifying catalyst according to the present invention comprising the above-described steps, a stable reduction rate of a metal ion enables preparation of very fine colloid particles and at the same time, a metal can be supported on a carrier in a highly dispersed form.

In the preparation process of the exhaust gas purifying catalyst according to the present invention, a plurality of active metals can be loaded on the catalyst. In other words, one or more noble metals can be incorporated as the active metal. A sufficient effect can be exhibited even if the loading amount is reduced to 0.7 g/L or less per metal.

WORKING EXAMPLES

In Examples 1 to 11, a metal colloid solution containing a single noble metal was prepared in accordance with the following procedures.

(1) Deionized water and, as a reducing agent, ethanol were prepared. The volume ratio of deionized water/reducing agent was 1/1.

(2) Deionized water (1.5 liters) was mixed with 1.5 liters of the reducing agent (the reducing agent solution) to prepare 3 liters of a mixed solution. To the resulting solution was added 32 g of polyvinyl alcohol as a polymer material. The resulting aqueous solution was boiled for one hour while keeping the temperature of it at 80° C., whereby dissolved oxygen was removed therefrom.

(3) To the resulting mixture was added 0.1 liter of a metal salt corresponding to each active metal to prepare a noble-metal-containing aqueous solution containing 75 mmol of an active metal.

(4) The noble-metal-containing aqueous solution was kept at 80° C. to carry out reduction treatment for 5 hours, whereby the metal colloid solution was obtained.

(5) A cordierite honeycomb substrate having 50 g/m² of a single γ-Al₂O₃ layer wash-coated thereon was immersed in 4000 cc of the aqueous metal colloid solution to load the active metal on the coat layer at a ratio as described in Table 1. After loading, the resulting catalyst was dried at 110° C. and calcined at 500° C. The loading amount of the catalyst is shown in Table 1 as the composition of an active component. The observation results of the appearance of the metal colloid supported on the catalyst is also described. When the metal colloid is loaded on the coat layer, how it is loaded depends on the concentration of the polymer material. Uneven distribution of the metal colloid is found from the appearance of the catalyst, depending on the concentration of the polymer material so that only uniformly colored catalyst is observed.

In Comparative Example 1, steps similar to those of Example 1 were carried out except that the amount of the polymer material used for covering the metal colloid was outside the preferred range. In Comparative Example 2, similar steps to those of Example 1 were carried out except that the ordinary impregnation method was employed without preparing a colloid solution.

The procedures employed in Examples 1 and 2, and Comparative Examples 1 and 2 will next be described more specifically.

Example 1

Preparation of Metal Colloid Solution:

To 1.5 liters of deionized water were added 1.5 liters of ethanol and 32 g of polyvinyl alcohol (average polymerization degree: 900 to 1100) to prepare 3 liters of a mixture. The resulting mixture was boiled for 1 hour to eliminate therefrom dissolved oxygen. To the residue was added 0.1 liter of diammine dinitro Pt to prepare a noble-metal-containing aqueous solution (containing 75 mmol of Pt). The resulting solution was kept at 90° C. and subjected to reduction treatment for 5 hours. After confirmation that the solution became black, the solution was ice-cooled and used as a Pt colloid solution. The pH of the solution at that time was 1.

Loading of Pt Colloid on Substrate:

After 4000 cc of an aqueous solution containing 0.07 wt. %, based on the total weight of the aqueous solution, of the above-described Pt colloid was prepared, a honeycomb substrate (50 mm long×50 mm wide×50 mm thick) having a BET specific surface area of 113 m²/g and having 50 g/m² of γ-Al₂O₃ applied thereto was immersed in the solution for 30 minutes, whereby a predetermined amount of Pt was loaded on the honeycomb substrate. A weight ratio of polyvinyl alcohol to the total weight of the aqueous solution was 0.16 wt. % and pH was 2.6 at that time. After loading, the catalyst was dried at 110° C. and then calcined at 500° C. for 5 hours. The catalyst thus obtained was a product of Example 1. According to the visual observation, the catalyst was uniformly colored black.

Preparation of Metal Colloid Solution:

To 1.5 liters of deionized water were added 1.5 liters of ethanol and 64 g of polyvinyl alcohol (average polymerization degree: 900 to 1100) to prepare 3 liters of a mixture. The resulting mixture was boiled for 1 hour to eliminate therefrom dissolved oxygen. To the residue was added 0.1 liter of diammine dinitro Pt to prepare a noble-metal-containing aqueous solution (containing 75 mmol of Pt). The resulting solution was kept at about 90° C. and subjected to reduction treatment for 5 hours. After confirmation that the solution became black, it was ice-cooled and used as a Pt colloid solution. The pH of the solution at that time was 1.

Loading of Pt Colloid to Substrate:

After 4000 cc of an aqueous solution containing 0.07 wt. %, based on the total weight of the aqueous solution, of the above-described Pt colloid was prepared, a honeycomb substrate (50 mm long×50 mm wide×50 mm thick) having a BET specific surface area of 113 m²/g and having 50 g/m² of γ-Al₂O₃ applied thereto was immersed in the solution for 1 hour, whereby a predetermined amount of Pt was loaded on the honeycomb substrate. A weight ratio of polyvinyl alcohol to the total weight of the aqueous solution was 0.3 wt. % and pH was 2.5 at that time. After loading, the catalyst was dried at 110° C. and then calcined at 500° C. for 5 hours. The catalyst thus obtained was a product of Example 2. According to the visual observation, the catalyst had partial shading, suggesting uneven distribution.

In Examples 3 to 11, catalysts were prepared in a similar manner to that employed in Example 1.

In each of the catalysts obtained in these Examples, an active metal having a particle size not greater than 15 nm was supported within a 50 μm depth from the surface of the coat layer of the carrier. In addition, within a 30 μm deep from the surface of the coat layer, at least 50 wt. % of the amount of the active metal was contained. The particle size was calculated by the CO adsorption method, while the distribution of the active metal in the coat layer was confirmed by EPMA.

Comparative Example 1

Preparation of Pt Colloid Solution:

To 1.5 liters of deionized water were added 1.5 liters of ethanol and 157 g of polyvinyl alcohol (average polymerization degree: 900 to 1100) to prepare 3 liters of a mixture. The resulting mixture was boiled for 1 hour to eliminate therefrom dissolved oxygen. To the resulting mixture was added 0.14 liter of diammine dinitro Pt to prepare a noble-metal-containing aqueous solution (containing 105 mmol of Pt). The resulting solution was kept at about 90° C. and subjected to reduction treatment. After confirmation that the solution became black, it was ice-cooled and used as a Pt colloid solution. The pH of the solution at that time was 1.

Addition of Pt Colloid to Substrate:

After 4000 cc of an aqueous solution containing 0.7 wt. %, based on the total weight of the aqueous solution, of the above-described Pt colloid was prepared, a honeycomb substrate (50 mm long×50 mm wide×50 mm thick) having a BET specific surface area of 113 m²/g and having 50 g/m² of γ-Al₂O₃ applied thereto was immersed in the solution for 5 hours. A weight ratio of polyvinyl alcohol to the total weight of the aqueous solution was 5.5 wt. % and pH at that time was 1. After loading, the catalyst was dried at 110° C. and then calcined at 500° C. for 5 hours. The catalyst thus obtained was a product of Comparative Example 1.

Comparative Example 2

A honeycomb substrate having 50 g/m² of γ-Al₂O₃ applied thereto was immersed in 4000 cc of an aqueous solution of diammine dinitro Pt for 30 seconds to load a predetermined amount of Pt on the resulting honeycomb substrate. After loading, the catalyst was dried at 110° C. and then calcined at 500° C. for 5 hours. The resulting catalyst was a product of Comparative Example 2.

Also in Comparative Examples 3 and 4, catalysts were obtained in a similar manner to Comparative Example 1 or 2.

Evaluation Conditions of Reactivity:

Under the below-described conditions, an evaluation test on the reactivity was performed for the catalysts prepared as described above in Examples 1 to 11 and Comparative Examples 1 to 4. In the test, respective pieces cut from the catalysts were evaluated. The results are as shown in Table 1. It can be understood that in Examples of the present invention, although the loading amount of a noble metal is small, the catalysts exhibit sufficient catalytic activity. Volatile organic compounds include all the organic compounds other than $CH_4$ and $C_2H_6$, but in this evaluation, $C_2H_4$ was used as a representative substance.

CO: 65 ppm, $C_2H_4$: 13 ppm, $NO_x$: 65 ppm, $O_2$: 15%, $CO_2$: 5%, $H_2O$: 7%, $N_2$: balance, GHSV: 156,000 $h^{-1}$, Amount of gas: 200 NL/h, Temperature of catalyst layer: 400° C., 300° C., 200° C.

The reactivity of a gas is represented by the following equations:

Reactivity (%) of CO=(1−concentration of CO at outlet/concentration of CO at inlet)×100

Reactivity (%) of $C_2H_4$=(1−concentration of $C_2H_4$ at 0outlet/concentration of $C_2H_4$ at inlet)×100

The exhaust gas purifying catalyst and the preparation process thereof according to the present invention can be used for purifying exhaust gases released from industrial equipment, for example, automobiles, airplanes and various factories.

Although the present invention has been described with reference to the specific embodiments and examples, it is not limited to them. All modifications, changes, and additions that are easily made by a person skilled in the art are embraced in the technical scope of the present invention.

What is claimed is:

1. A catalyst for purifying an exhaust gas containing carbon monoxide and volatile organic compounds, comprising:

a single coat layer of a carrier comprising a porous inorganic compound, the porous inorganic compound comprising a BET specific surface area of 50 $m^2$/g or greater, and the single coat layer having, within a 50 μm depth from the surface thereof, an active metal having a particle size of 15 nm or less and comprising at least one noble metal.

2. A catalyst for purifying an exhaust gas according to claim 1, wherein the single coat layer has, within a 30 μm depth from the surface thereof, 50 wt.% or greater of an amount of the noble metal to be loaded.

3. A catalyst for purifying an exhaust gas according to claim 1, wherein the coat layer extends continuously from a surface to a predetermined depth and a 30 μm depth from the

TABLE 1

| Example | Active component Kind | Amount (g/L) | Size (mm) | Composition of carrier | BET specific surface area ($m^2$/g) | Noble-metal-loading condition, visually observed | Reactivity (%) at 200° C. $C_2H_4$ | CO | Reactivity (%) at 300° C. $C_2H_4$ | CO | Reactivity (%) at 400° C. $C_2H_4$ | CO |
|---|---|---|---|---|---|---|---|---|---|---|---|---|
| 1 | Pt | 0.3 | 11 | γ-$Al_2O_3$ | 113 | ○ | 44 | 70 | 71 | 80 | — | — |
| 2 | Pt | 0.07 | 3.8 | γ-$Al_2O_3$ | 113 | Δ | 32 | 60 | 50 | 70 | — | — |
| 3 | Pt | 0.3 | 8.1 | $SiO_2$ | 95 | ○ | 41 | 63 | 51 | 73 | — | — |
| 4 | Pt | 0.3 | 13 | $TiO_2$ | 50 | ○ | 48 | 65 | 68 | 75 | — | — |
| 5 | Pt | 0.3 | 10 | $ZrO_2$ | 101 | ○ | 51 | 58 | 61 | 68 | — | — |
| 6 | Pt | 0.3 | 10.2 | $SiO_2$—$Al_2O_3$ | 157 | ○ | 53 | 64 | 63 | 74 | — | — |
| 7 | Pt | 0.3 | 10.7 | $TiO_2$—$SiO_2$ | 130 | ○ | 50 | 60 | 70 | 70 | — | — |
| 8 | Pt | 0.3 | 13.8 | $TiO_2$—$Al_2O_3$ | 74 | ○ | 43 | 60 | 60 | 70 | — | — |
| 9 | Pt | 0.3 | 10.1 | $TiO_2$—$ZrO_2$ | 63 | ○ | 50 | 61 | 60 | 71 | — | — |
| 10 | Pd | 0.6 | 11.2 | γ-$Al_2O_3$ | 113 | ○ | — | — | 25 | 60 | — | — |
| 11 | Ru | 0.6 | 10.5 | γ-$Al_2O_3$ | 113 | ○ | — | — | 30 | 22 | — | — |
| Comparative Example 1 | Pt | 0.01 | — | γ-$Al_2O_3$ | 113 | ○ | 10 | 30 | — | — | — | — |
| Comparative Example 2 | Pt (Impregnation method) | 0.6 | 8.1 | γ-$Al_2O_3$ | 113 | Δ | 8 | 10 | 41 | 70 | — | — |
| Comparative Example 3 | Pd (Impregnation method) | 0.9 | 105 | γ-$Al_2O_3$ | 113 | Δ | — | — | 16 | 46 | 31 | 63 |
| Comparative Example 4 | Ru (Impregnation method) | 3.5 | 14.5 | γ-$Al_2O_3$ | 113 | Δ | — | — | 15 | 15 | 30 | 21 |

○ Uniformly colored, Δ has some shading, x: scarcely colored.

surface thereof, and wherein the 50 wt.% or greater of an amount of the noble metal is loaded.

4. A catalyst for purifying an exhaust gas according to claim 1, wherein the porous inorganic compound is selected from a group consisting essentially of: $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, and $SO_4/TiO_2$—$ZrO_2$.

5. A catalyst for purifying an exhaust gas according to claim 1, wherein the porous inorganic compound comprises $\gamma$-$Al_2O_3$.

6. A preparation process of a catalyst for purifying an exhaust gas as claimed in claim 1, which comprises subjecting an aqueous metal salt solution obtained by dissolving at least one metal salt in water to reduction treatment to prepare a corresponding aqueous metal colloid solution, and immersing a carrier in the aqueous metal colloid solution to load the active metal on the coat layer.

7. A preparation process for preparing a catalyst for purifying an exhaust gas comprising:
- immersing a honeycomb substrate comprising $\gamma$-$Al_2O_3$ having a BET specific surface area of 50 $m_2$/g or greater, in an aqueous solution of a noble metal.;
- permitting the water in the aqueous solution to penetrate into a coating layer of $\gamma$-$Al_2O_3$;
- introducing noble metal colloid particles coated with a polymer into the water in the coating layer of $\gamma$-$Al_2O_3$;
- permitting the noble metal colloid particles to be absorbed by the $\gamma$-$Al_2O_3$layer;
- removing the honeycomb substrate from water; and
- removing the polymer by drying and calcining the honeycomb substrate.

* * * * *